Patented Jan. 24, 1939

2,145,206

UNITED STATES PATENT OFFICE 2,145,206

DEPRESSION OF CARBONACEOUS MATERIAL IN FLOTATION

Robert B. Booth, Springdale, Conn., assignor to American Cyanamid Company, New York, N. Y., a corporation of Maine No Drawing. Application February 1, 1938, Serial No. 188,075

8 Claims. (Cl. 209—166)

This invention relates to the flotation of carbonaceous precious metal ores.

In the past, a number of precious metal ores containing carbon have presented a serious problem in ore dressing. The carbon tends to be slimy and also floats readily. The sliminess of the carbon actually affects the float in many cases and the presence of carbon in the concentrate is a distinct disadvantage when it is desired to subject the concentrate to cyanidation. It has been proposed to depress the carbon during flotation using a starch reagent prepared by boiling starch with caustic soda. When used with precious metal ores, however, this soluble starch does not give good metallurgy because when used in amounts sufficient to give even fair carbon depression, it tends to depress some of the constituents carrying the values particularly in the case of pyritic gold ores.

In the present invention, I have found that dextrines and particularly yellow corn dextrine possess all of the advantages of highly efficient carbon depression without possessing the disadvantage of excessive depression of precious metal values when used in amounts sufficient to give effective carbon depression. In this manner, by using amounts of dextrine which give good carbon depression, it is possible to obtain better metallurgy with most carbonaceous precious metal ores than with other reagents.

The term "dextrine" is frequently loosely applied in the industry to cover a large number of degraded cellulosic products. According to the present invention, however, dextrine is used in its strict sense as covering the products obtained by substantially dry heat degradations of cellulosic material such as starch with or without preliminary treatment with material such as acids. The term "dextrine" will be used in no other sense in the present specification and claims and is not intended to include materials obtained by digesting starch in various aqueous solutions which are sometimes loosely referred to as dextrinized products. These latter products do not exhibit the properties of true dextrines in the flotation of precious metal ores and are not included in the scope of my invention.

While all true dextrines show the valuable properties set out above, different dextrines will vary in the degree to which they possess these properties and in general the best results are obtained with yellow corn dextrines which result from the dry heating of corn starches which have been pretreated with acids such as nitric acid.

The amounts of dextrine required will vary to some extent with the ore and with the dextrine. In all cases, it is necessary to use sufficient amounts of dextrine to effectively depress carbon but the amount should not be large enough to seriously depress precious metal values. To some extent this may be considered as a compromise but it is an advantage of the present invention that an amount of dextrine, particularly of yellow corn dextrine, which gives very effective carbon depression is well below the amount that seriously depresses precious metal values, particularly in pyritic ores. In general, effective depression of carbon begins with amounts of dextrine from about 0.2 to 0.3 lbs./ton, depending on the dextrine. In the case of some ores, amounts of dextrine as high as 6 lbs./ton have been used with success. In general, however, it is desirable to keep the dextrine as low as possible and with most ores amounts of dextrine from 1 to 2 lbs./ton of ore give good results but of course the invention is not limited to this particular range.

The invention will be described in detail in the following specific examples in conjunction with various dextrines and with different typical carbonaceous precious metal ores. The invention is of course not limited to the details of the specific examples which are typical illustrations only.

The present invention may be used in rougher flotation of the ore where desired or it may be used only in a cleaning operation. The advantage of the invention is particularly high in cleaning and therefore the best operating procedure may involve a rougher float without dextrine or with smaller amounts of dextrine.

Example 1

Carbonaceous pyritic gold ore from the Mother Lode district was subjected to flotation with and without the use of dextrine. The ore assayed 0.140 to 0.146 ozs./ton of gold and about 0.69% carbon. The flotation was effected in Fagergren flotation machines. In both cases the ore was conditioned with soda ash and copper sulfate and the following flotation reagents used: secondary butyl xanthate, .36 lb./ton; a fifty-fifty mixture of sodium diethyl- and disecondary-butyl- dithiophosphates, 0.03 lb./ton; and pine oil, 0.123 lb./ton. In one float an additional 2 lbs./ton of yellow corn dextrine was added to the ore during the grinding operation. The metallurgical results are as follows, the first line showing the test without dextrine and the second line with:

| Feed | | | Concentrate | | | | Tailing | | |
|---|---|---|---|---|---|---|---|---|---|
| Gold oz./ton | Wt. gs. | Wt. percent | Wt. percent | Ratio conc. | Gold oz./ton | Dist. percent gold | Wt. percent | Gold oz./ton | Dist. percent gold |
| 0.140 | 602.6 | 100 | 13.14 | 7.6:1 | 0.940 | 88.57 | 86.86 | 0.018 | 11.43 |
| 0.146 | 600.6 | 100 | 12.05 | 8.3:1 | 1.140 | 93.84 | 87.95 | 0.010 | 6.16 |

Example 2

An ore of the same character from the same region was subjected to rougher flotation without dextrine and the rougher concentrate assaying 2.13 to 2.336 ozs./ton of gold and 8.23% carbon cleaned without additional promotors. In both cases the flotation was in Fagergren machines. The metallurgy appears in the following table in which the first line is the cleaning operation without dextrine and the second in the presence of 2 lbs./ton of yellow corn dextrine:

| Feed | | | Concentrate | | | | Tailing | | |
|---|---|---|---|---|---|---|---|---|---|
| Gold ozs./ton | Wt. gs. | Wt. percent | Percent wt. | Ratio conc. | Gold ozs./ton | Dist. percent gold | Wt. percent | Gold oz./ton | Dist. percent gold |
| 2.336 | 589.4 | 100 | 90.97 | 1.1:1 | 2.540 | 98.93 | 9.03 | 0.280 | 1.07 |
| 2.330 | 301.0 | 100 | 63.95 | 1.6:1 | 3.520 | 96.61 | 36.05 | 0.220 | 3.39 |

It will be noted that a very marked increase in grade is obtained with negligible loss of recovery because the 2.32% lower recovery represents middlings which are returned to the rougher circuit and the values of which are for the most part recovered.

In order to obtain a still further improvement in grade, the original concentrate was subjected to a cleaning and recleaning operation in the presence of additional flotation reagents. The concentrate was first conditioned with 4 lbs./ton of yellow corn dextrine and floated with 2 lbs./ton of copper sulfate, an additional pound of yellow corn dextrine and 0.2 lb./ton of secondary butyl xanthate. This concentrate was then mixed with a further pound per ton of yellow corn dextrine giving a total of 6 lbs./ton and recleaned with the same amounts added of copper sulfate and secondary butyl xanthate.

A second test was made with the same amounts of reagents except that instead of stage feeding the dextrine in the cleaner float, all of the 5 lbs./ton of the dextrine present in this operation were introduced in the conditioning. The results are shown in the following table, the first line being the test with stage feeding and the second without:

as against 86%. These important savings are met with a negligible loss in grade.

The carbon assays from the flotation products were as follows:

| Feed | Recleaned concentrate | Recleaned tailing | Cleaner tailing |
|---|---|---|---|
| 8.23 | 3.83 | 17.53 | 8.80 |

It wil be noted that in the case of cleaning of concentrates, a very great increase in grade is obtainable with larger amounts of dextrine with only a slight loss in recovery, most of which is regained as the recleaner tails pass back into the cleaner circuit.

Example 3

A copper-gold ore containing graphite and having the following assay for copper, gold and carbon:

Gold _____ oz./ton __ 0.496–0.627
Copper _____ per cent __ 0.91
Carbon _____ do ____ 7.15 was subjected to flotation in Fagergren machines with and without dextrine. In the case of this ore, the effects of various dextrines were tried. The flotation reagents other than dextrine were as follows: secondary butyl xanthate, 0.05 lb./ton; a fifty-fifty mixture of sodium diethyl- and disecondarybutyl-dithiophosphates, 0.05 lb./ton; added to the grinding operation, the same amounts of reagent added in a conditioning operation and in addition, 0.45 lb./ton of dicresyldithiophosphate added to the float just prior to the flotation together with 0.078 lb./ton of a synthetic frother consisting of a mixture of higher aliphatic alcohols and a saturated hydrocarbon. The first was carried out in the ab-

| Feed | | | Recleaner concentrate | | | | Recleaner tailing | | | Cleaner tailing | | |
|---|---|---|---|---|---|---|---|---|---|---|---|---|
| Gold ozs./ton | Wt. gs. | Wt. per cent | Wt. per cent | Ratio conc. | Gold ozs./ton | Dist. percent gold | Wt. percent | Gold oz./ton | Dist. percent gold | Wt. percent | Gold oz./ton | Dist. percent gold |
| 2.313 | 305.3 | 100 | 39.86 | 2.5:1 | 5.520 | 95.12 | 16.12 | 0.54 | 3.76 | 44.02 | 0.06 | 1.12 |
| 2.337 | 289.8 | 100 | 36.03 | 2.8:1 | 5.600 | 86.35 | 15.94 | 1.52 | 10.36 | 48.03 | 0.16 | 3.29 |

It will be noted that stage feeding of the dextrine results in a much lower cleaner tail, less than one half the gold, and a much higher recovery in the recleaner concentrate, about 95% as against 86%. sence of dextrine and an additional eight tests were carried out with various amounts of yellow and white dextrines, the metallurgical results and amounts of dextrine appearing in the following table, together with the per cent of carbon rejected in the tailing:

| Depressant | | Feed | | Concentrate | | | | Tailings | | | |
|---|---|---|---|---|---|---|---|---|---|---|---|
| Type | Lb./ton | Gs. | Gold oz./ton | Wt. percent | Ratio conc. | Gold oz./ton | Percent gold recov. | Wt. percent | Gold oz./ton | Percent gold | Percent carbon rejected |
| None | | 651.1 | 0.583 | 27.77 | 3.6:1 | 1.840 | 87.65 | 72.23 | 0.10 | 12.35 | 0.28 |
| Yellow corn dextrine | 0.5 | 650.7 | 0.524 | 21.70 | 4.6:1 | 2.160 | 89.50 | 78.30 | 0.07 | 10.50 | 12.32 |
| Do | 1.0 | 651.6 | 0.503 | 20.29 | 4.9:1 | 2.320 | 93.64 | 79.71 | 0.04 | 6.36 | 36.63 |
| Yellow potato dextrine | 0.5 | 651.1 | 0.570 | 24.36 | 4.1:1 | 2.200 | 94.04 | 75.64 | 0.045 | 5.96 | 0.43 |
| Do | 1.0 | 651.2 | 0.496 | 23.91 | 4.2:1 | 1.960 | 94.56 | 76.09 | 0.035 | 5.44 | 10.34 |
| White potato dextrine | 0.5 | 652.9 | 0.531 | 24.18 | 4.1:1 | 2.040 | 92.84 | 75.82 | 0.05 | 7.16 | 0.70 |
| Do | 1.0 | 652.3 | 0.627 | 24.33 | 4.1:1 | 2.280 | 88.52 | 75.67 | 0.095 | 11.48 | 0.56 |
| White corn dextrine | 0.5 | 654.6 | 0.551 | 23.82 | 4.2:1 | 2.200 | 95.10 | 76.18 | 0.035 | 4.90 | 0.58 |
| Do | 1.0 | 649.5 | 0.596 | 22.66 | 4.4:1 | 2.320 | 88.26 | 77.34 | 0.090 | 11.74 | 2.72 |

*Example 4*

A silver ore containing about 2% carbon and assaying 17.72 to 17.96 ozs./ton was subjected to flotation in Fagergren machines in the presence of 0.5 lb./ton of yellow corn dextrine and in a separate test, with 1.5 lbs./ton of a common dispersing agent, namely, water glass. The metallurgical results were as follows:

| | Concentrate | | | Tailing | | | Feed | | |
|---|---|---|---|---|---|---|---|---|---|
| | Wt. percent | Ag oz./ton | Dist. Ag | Wt. percent | Ag oz./ton | Wt. Ag | Wt. percent | Ag oz./ton | Dist. Ag |
| Water glass | 4.64 | 287.50 | 74.28 | 95.36 | 4.84 | 25.72 | 100 | 18.96 | 100 |
| Yellow corn dextrine | 2.61 | 455.60 | 67.10 | 97.39 | 5.99 | 32.90 | 100 | 17.72 | 100 |

It will be apparent that dextrine does not act purely as a dispersing agent as it gives results which are greatly superior to those obtained with a pure dispersing agent.

What I claim is:

1. A method of floating carbonaceous precious metal ores which comprises subjecting an aqueous pulp of a carbonaceous precious metal ore to froth flotation in the presence of a dextrine.

2. A method of floating carbonaceous precious metal ores which comprises subjecting an aqueous pulp of a carbonaceous precious metal ore to froth flotation in the presence of yellow corn dextrine.

3. A method of floating carbonaceous pyritic precious metal ores which comprises subjecting a pulp of the precious metal ore to froth flotation in the presence of a dextrine.

4. A method of floating carbonaceous pyritic precious metal ores which comprises subjecting a pulp of the precious metal ore to froth flotation in the presence of yellow corn dextrine.

5. A method of floating carbonaceous precious metal ores which comprises subjecting the ore to froth flotation in a rougher float in the absence of a dextrine and cleaning the rougher concentrate thus obtained by froth flotation in the presence of a dextrine.

6. A method of floating carbonaceous precious metal ores which comprises subjecting the ore to froth flotation in a rougher float in the absence of a dextrine and cleaning the rougher concentrate thus obtained by froth flotation in the presence of yellow corn dextrine.

7. A method according to claim 1 in which a portion of the dextrine is introduced prior to flotation and the remainder during flotation.

8. A method according to claim 2 in which a portion of the dextrine is introduced prior to flotation and the remainder during flotation.

ROBERT B. BOOTH.

CERTIFICATE OF CORRECTION.

Patent No. 2,145,206.   January 24, 1939.

ROBERT B. BOOTH.

It is hereby certified that error appears in the printed specification of the above numbered patent requiring correction as follows: Page 3, lines 29 and 30, in the heading to the table, for "Wt. Ag" read Dist. Ag; and that the said Letters Patent should be read with this correction therein that the same may conform to the record of the case in the Patent Office.

Signed and sealed this 14th day of March, A. D. 1939.

Henry Van Arsdale.

(Seal)   Acting Commissioner of Patents.